United States Patent
Razzell

(10) Patent No.: US 12,040,922 B2
(45) Date of Patent: Jul. 16, 2024

(54) SYSTEMS AND METHODS FOR SPECTRAL SHAPING OF PRE-EQUALIZED TRANSMITTER SIGNALS

(71) Applicant: Analog Devices, Inc., Wilmington, MA (US)

(72) Inventor: Charles Razzell, Pleasanton, CA (US)

(73) Assignee: Analog Devices, Inc., Wilmington, MA (US)

( * ) Notice: Subject to any disclaimer, the term of this patent is extended or adjusted under 35 U.S.C. 154(b) by 64 days.

(21) Appl. No.: 17/987,935

(22) Filed: Nov. 16, 2022

(65) Prior Publication Data
US 2024/0163143 A1    May 16, 2024

(51) Int. Cl.
H04L 27/01    (2006.01)
H04L 25/02    (2006.01)

(52) U.S. Cl.
CPC ............ H04L 27/01 (2013.01); H04L 25/028 (2013.01)

(58) Field of Classification Search
CPC .. H04L 27/01; H04L 25/028; H04L 25/03057
See application file for complete search history.

(56) References Cited

U.S. PATENT DOCUMENTS

| | | | | |
|---|---|---|---|---|
| 7,693,233 B2* | 4/2010 | Gu | ................... | H04L 25/03343 |
| | | | | 712/E9.043 |
| 7,769,099 B2* | 8/2010 | Parhi | ................. | H04L 25/03343 |
| | | | | 375/243 |
| 8,009,823 B2* | 8/2011 | Parhi | ................. | H04L 25/03343 |
| | | | | 379/406.13 |
| 8,625,704 B1* | 1/2014 | Sedarat | .................... | H04B 3/32 |
| | | | | 375/295 |
| 8,681,849 B2* | 3/2014 | Taubin | ................ | H04L 25/4975 |
| | | | | 375/232 |
| 9,020,021 B2* | 4/2015 | Kossel | .................... | H04L 27/01 |
| | | | | 455/39 |
| 2004/0096022 A1* | 5/2004 | Zhang | .................... | H04L 25/493 |
| | | | | 375/353 |
| 2010/0260253 A1* | 10/2010 | Hovakimyan | ........ | H04L 25/497 |
| | | | | 375/233 |
| 2015/0063828 A1* | 3/2015 | Bliss | ...................... | H04B 10/25 |
| | | | | 398/189 |
| 2016/0359657 A1* | 12/2016 | Lida | .................... | H04L 25/4975 |

* cited by examiner

*Primary Examiner* — Freshteh N Aghdam
(74) *Attorney, Agent, or Firm* — North Weber & Baugh LLP; Michael North

(57) ABSTRACT

Simple, low-cost systems and methods allow to shape the output spectrum of pre-equalized Tomlinson Harashima Precoding (THP)-equalized transmitters in a manner such as to create a relatively narrow DC null to facilitate transmission over DC-null channels in AC-coupled communication channels. Advantageously, this may be accomplished without significantly adding to the peak value of the to-be-transmitted signal and without the need to resort to high-order filters in the signal path or the use of recursive taps to compensate such filters.

20 Claims, 7 Drawing Sheets

SYSTEMS AND METHODS FOR SPECTRAL SHAPING OF PRE-EQUALIZED TRANSMITTER SIGNALS

BACKGROUND

A. Technical Field

The present disclosure relates generally to signal processing circuits utilizing equalizer technology. More particularly, the present invention relates to digital equalizers that employ Tomlinson Harashima Precoding (THP) and related equalization techniques in high-speed communication circuits.

B. Background

THP is an equalization technique that takes advantage of the benefits provided by moving the feedback portion of a receiver-side Decision Feedback Equalizer (DFE) into the transmitter. In general, the receiver of a DFE-based system consists of a linear feed-forward section that has a Finite Impulse Response (FIR) filter with no recursion and a decision block that feeds into a feedback section. Since these decisions are subject to noise, residual intersymbol interference (ISI), etc., they are prone to errors. These errors iteratively propagate back through the feedback loop, thus, generating bursts of inaccurate data that negatively impact forward error correction (FEC) performance.

In contrast, in THP-based systems, the decision block is replaced by perfect knowledge of the transmitted data and the recursive digital feedback filter, which partially or entirely equalizes the communication channel, is moved to the transmitter, leaving only the linear filter in the receiver. Because THP-based systems replace low-confidence decisions with perfect knowledge of the data symbols to be transmitted, they, advantageously, are not subject to error propagation. Further, instabilities of the recursive filter, which correspond to poles potentially lying outside the unit circuit, are controlled by modulo arithmetic within the feedback loop to constrain output values to lie within the span of the chosen modulus value. Moreover, unlike DFEs, which have very limited scope for parallel implementation architectures, recursive filtering in THP applications can be parallelized—an important step in reaching Baud rates that are expected in next-generation equalizer technologies.

In applications where the communication channel is AC-coupled, ideally, the spectrum of the transmitted signal is shaped such as to exhibit a null, or notch, at DC to allow the signal to pass through the channel without degradation. In existing applications, DC-free algebraic line codes are used for this purpose. In THP applications, however, the non-linear modulo operation would override the spectral null created by a line code and, thus, render the effort futile. One possible solution involves creating one or more zeros at DC using conventional FIR filtering after THP processing and compensating said zeros by matching poles that are added to the recursive filter of the standard THP circuit. However, creating a narrow DC null using FIR filters requires a relatively large number of taps, which significantly increases power consumption and complexity. This is exacerbated when matching poles are utilized for cancellation in the recursive filter portion of the THP.

Accordingly, what is needed are systems and methods that can impose a relatively narrow DC null on the output spectrum of THP-equalized transmitters, without the need to resort to high-order filters in the signal path and the use of recursive taps to compensate such filters.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
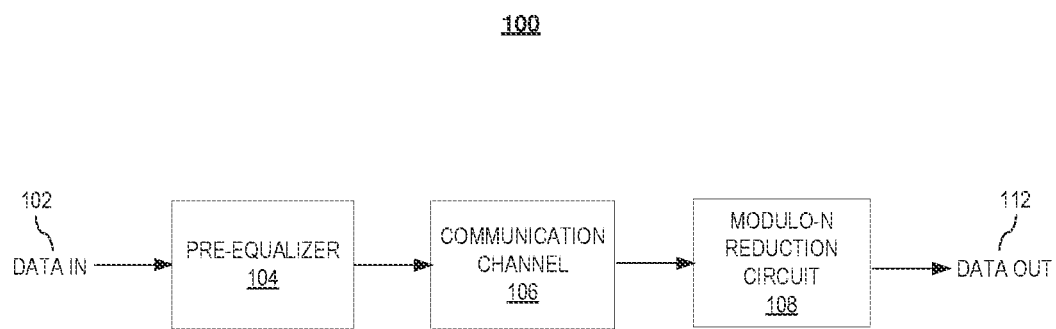
FIG. 1 depicts a communication system that employs a common THP equalizing scheme.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It is further understood that throughout this discussion that components may be described as separate functional units, which may comprise sub-units, but those skilled in the art will recognize that various components, or portions thereof, may be divided into separate components or may be integrated, e.g., within a single system or component. It is noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional, or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Each reference mentioned in this patent document is incorporate by reference herein in its entirety.

In this document, the terms "modulo reduction circuit," "modulo-N reducing device," "symmetric modulo reduction circuit," and "modulo-limited recursive filter" are used interchangeably and refer to a circuit that comprises a recursive digital filter whose output signal amplitude is limited by symmetrical modulo wrapping, or any mathematically equivalent scheme.

Demand for ever-increasing serial data transmission in automotive and other applications drives the quest for more sophisticated and powerful equalizer technology. THP technology allows the use of an equivalent of a DFE without the main drawback of DFEs, i.e., inherent error propagation caused by incorrect slicer decisions at the receiver. Automatic equalizer circuits may use feed-forward transversal filters alone or in combination with a feedback filter utilizing local decisions at the receiver. These local decisions act as a non-linear function with the feedback loop and thus avoid any potential instability due to poles lying outside of the unit circle, but the resulting decisions are inherently unreliable due to thermal noise, residual ISI, non-linearities, etc. Such equalizers are termed decision feedback equalizers (DFEs) and are widely deployed in high-speed communications links. A key disadvantage of the DFE is that its performance can be limited by error propagation, especially when large magnitude DFE tap weights are used. Such error propagation leads to long bursts of decision errors which present a challenge for subsequent FEC since the number of errors may exceed the Hamming distance or free distance of the error correction scheme. A radical solution to the problem of error propagation is to relocate the recursive feedback filter section from the receiver to the transmitter, where the actual symbols used are known perfectly and the need for local decisions is eliminated. However, by removing the need for a non-linear decision block within the feedback loop, the ability of the non-linear decision, or data slicer, to limit the potential unconstrained growth of signal magnitudes due to poles outside of the unit circuit is also removed.

Some approaches that attempt to mitigate the possibility of instabilities caused by a regular inverse filter utilize modulo-limited recursive filter modulo arithmetic to limit the signal magnitude to prevent the filter state variables from growing without limit. This modulo reduction operation may be implemented as a discrete operational block within the feedback loop or by using the adders that are subject to modulo wrapping, e.g., as an inherent property of the fixed-point binary arithmetic typically used in digital signal processing hardware implementations. The modulo operation, whether explicit or implicit, should result in output magnitudes that are symmetrically limited with respect to zero, i.e., if the modulo span is N, then the output of the modulo operation should be limited to magnitudes between $-N/2$ and $+N/2$. Mathematically, $$\left(-\frac{N}{2}, +\frac{N}{2}\right]$$

the output magnitude may be viewed as being limited to the range by conditional summation of the original signal with, e.g., with a suitably designed correction signal having a magnitude kN, where k is an integer that is chosen at every discrete sample time to restore the signal to the range specified. A recursive digital filter having its amplitude limited by symmetrical modulo wrapping, or any scheme that is mathematically equivalent thereto, is herein referred to as a modulo-limited recursive filter. Therefore, modulo reduction, as used herein, comprises adding or subtracting an integer multiple of a modulo span to a signal such that the output of the summation lies within a specified modulo span, or any other type of operations that produce a mathematically equivalent outcome, e.g., by using the previously mentioned inherent wrap-on-overflow properties of fixed-precision arithmetic hardware.

In equalizer applications, a modulo-limited recursive filter may be used, e.g., in a pre-equalizer to pre-equalize data in a signal that comprises pulses having amplitudes between $$-\frac{N}{2} + \frac{1}{2} \text{ and } + \frac{N}{2} - \frac{1}{2}$$

to create an output signal having amplitudes between $$-\frac{N}{2} \text{ and } +\frac{N}{2}.$$

The pre-equalized output signal may then be transmitted over an ISI channel to a receiver that may process the incoming signal using a linear, feed-forward signal followed by a modulo-N reducing device similar to the one used in the transmitter circuit. The modulo-N reducing device may act to collapse signal values that lie outside the range $$\left(-\frac{N}{2}, +\frac{N}{2}\right]$$

back to values approximating the original pulse amplitude values that were input to the pre-equalizer at the transmitter.

FIG. 1 depicts a communication system that employs a common THP equalizing scheme. System 100 represents an automatic equalizer circuit or adaptive equalizer circuit that comprises data input 102, pre-equalizer 104, communication channel 106, modulo-N reduction circuit 108, and data output 112. Data input 102 is typically a PAM signal (e.g., a PAM-4 signal). Conventional pre-equalizers are typically implemented in the transmitter and comprise an IIR filter wherein the feedback path (not shown in FIG. 1) comprises a summation with the data input 102. Since the IIR filter may be unstable and cause the signal amplitude of data input 102 to build up in an uncontrolled manner, pre-equalizer 104 further comprises a device, such as a logic circuit (not shown), that performs a modulo operation, i.e., an operation that is mathematically equivalent to summation with some discrete signal having an amplitude that goes up and down by a predefined modulo constant. The modulo operation is used to keep the signal amplitude within tight bounds of a predetermined window that is symmetric with respect to zero amplitude.

Modulo-N reduction circuit 108 provides a second modulo operator at the receiver to create a second modulo operation to the one used at pre-equalizer 104 to collapse a multiplicity of modulo-equivalent amplitudes, which can arise due to the effective linear filtering of communication channel 106, to unique, information-bearing pulse amplitudes for subsequent detection. As discussed further below, in embodiments herein, modulo-N reduction circuit 108 may utilize the same or similar modulo operation as in the transmitter. As a result, the recursive filter in the transceiver may use PAM signal 102 to generate any intermediate value. Further, in embodiments herein, the FIR filter in the receiver together with the modulo operation may restore PAM-4 signal 102 to appear as having 4 discrete levels. One effect of the transmitted data undergoing a modulo-N reduction is that an overall system transfer function of unity may be obtained for a system like system 100. Stated differently, after transmission, once the transmitted data is modulo-N reduced, the original data can be regenerated. Advantageously, unlike in post-equalizing methods, pre-equalizing reduces the possibility of DFE error propagation caused by noise arising in the communication channel. In addition, input data 102 may be scrambled using a pre-defined pseudorandom binary sequence, such that even when input data 102 is zero, pre-equalizer 104 may produce a high entropy output signal having an approximately white power spectrum.

Once the impulse response of communication channel 106 is known, or obtained by any means known in the art, optimum feedforward and feedback taps may be computed according to Minimum Mean Squared Error (MMSE) criteria, or according to Zero Forcing (ZF) criteria as desired, using standard methods that employ linear algebra. The obtained feedback taps may then be used to initialize the modulo limited recursive filter described above, while feedforward tap values may be used to initialize the receiver-side linear equalizer, if any. Subsequently, iterative updates to the tap weights may be used to track changes in the channel, e.g., by utilizing gradient descent iterations, such as the Least Mean Square (LMS) update equation based on slicer error signals measured at the receiver. Therefore, tap adaption requires feedback from the receiver to the transmitter to keep the transmit-side pre-equalization optimally adjusted.

As previously mentioned, one disadvantage of the modulo operation is that it precludes methods such as the use of algebraic line codes to form a notch at DC since the spectrum of the modulo operation is superimposed to the overall circuit response of the THP-based transmitter. Therefore, it is highly desirable to have simple, low-cost systems and methods for shaping the output spectrum of a pre-equalized THP transmitter to create the desired a DC null, especially to enable transmission over DC-null channels in AC-coupled communication channels.

Figure 2:
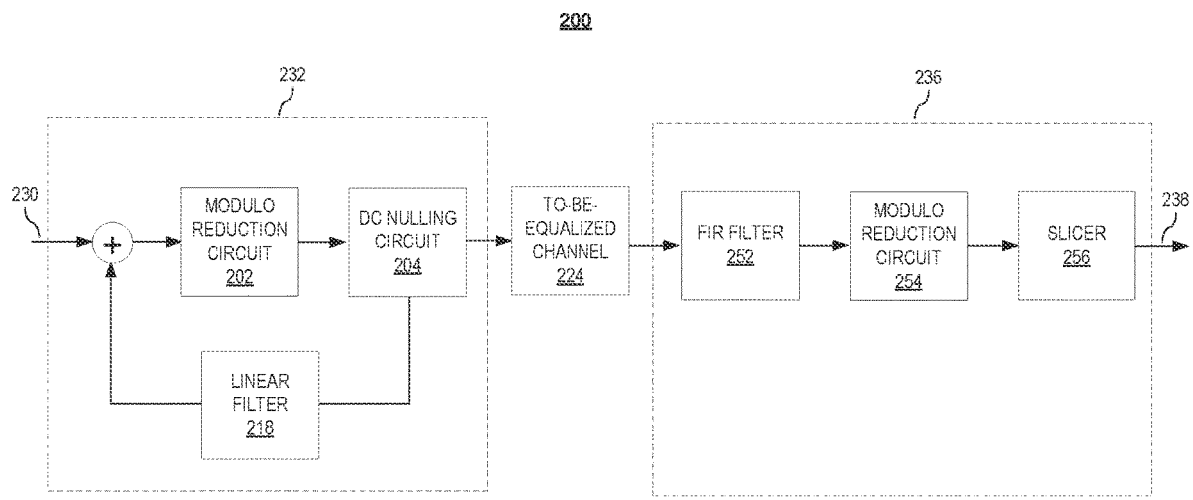
FIG. 2 illustrates an exemplary block diagram of a communication system according to various embodiments of the present disclosure.

FIG. 2 illustrates an exemplary block diagram of a communication system according to various embodiments of the present disclosure. System 200 comprises respective input and output signals 230 and 238; transmitter circuit 232, which may comprise modulo reduction circuit 202 and DC nulling circuit 204, and linear filer 218; communication channel 224; and receiver 236, which may comprise FIR filter 252; modulo reduction circuit 254 (or its functional equivalent); and slicer 256. It is noted that the analog portion of transmitter circuit 232 is not separately shown in FIG. 2. As a person of skill in the art will appreciate, other and/or additional circuit elements, inputs, and outputs may be used to accomplish the objectives of the present disclosure.

As depicted, modulo reduction circuit 202 in transmitter circuit 232 receives input signal 230, which may be any signal that may have undergone some type of baseband modulation, such as non-return to-zero (NRZ) scheme or a PAM constellation of a number N of discrete levels (e.g., PAM-4 or PAM-8).

Once transmitter circuit 232 receives input signal 230, input signal 230 may be processed by linear filter 218, e.g., a recursive digital filter placed in the feedback path of modulo reduction circuit 202 and DC nulling circuit 204, both discussed in greater detail with reference to FIG. 3. After being at least partially processed, input signal 230 may then be transmitted, via a to-be-equalized communication channel 224, to receiver 236, e.g., for further processing. It is understood that communication channel 224 may be a transmission line, such as a cable or waveguide, or any other communication channel known in the art.

In embodiments, symmetric modulo reduction circuit 202, or its functional equivalent, which may be achieved by any other means, such as the previously-mentioned wrap-on-overflow arithmetic, may operate on the sum of input signal 230 and the output of recursive feedback filter 218 to generate an output that may then be processed by DC nulling circuit 204 prior to being transmitted to receiver 236. In embodiments, receiver 236 may operate as a linear equalizer that, in response to receiving the transmitted signal from channel 224, performs an additional modulo operation on that signal, e.g., to restore signal 230.

Figure 4:
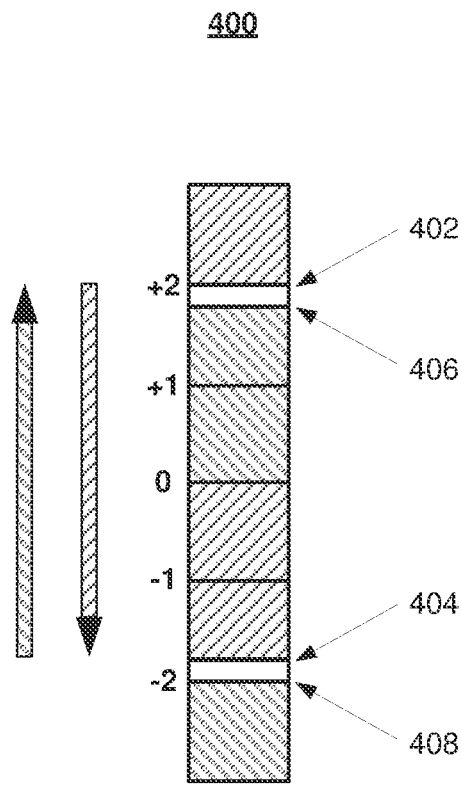
FIG. 4 illustrates an exemplary use of the Pulse Amplitude Modulation (PAM) decision space as a redundancy according to various embodiments of the present disclosure.

In various THP-based embodiments, DC nulling circuit 204 may insert into input signal 230 a zero (or null) at DC before the signal reaches the output of transmitter circuit 232. In embodiments where input signal 230 is a PAM signal, this may be accomplished by utilizing a relatively small portion of the PAM decision space as a redundancy, as illustrated in FIG. 4.

Unlike feasible but relatively complex approaches that would have to rely on high-order linear FIR filters and corresponding compensation circuitry, the systems and methods described herein may trigger conditional add and/or subtract operations whenever input signal 230 lies in a region that is sufficiently close to the modulo boundary, such that either one of two symbols may be used. Advantageously, this creates a relatively narrow and stable notch at or near DC and drives the average DC value back to zero in a way that is transparent to receiver 236, and without significantly adding to the peak value of the to-be-transmitted input signal 230. The term "near zero" in regards to the notch is defined as a range between 10% in each direction.

Figure 3:
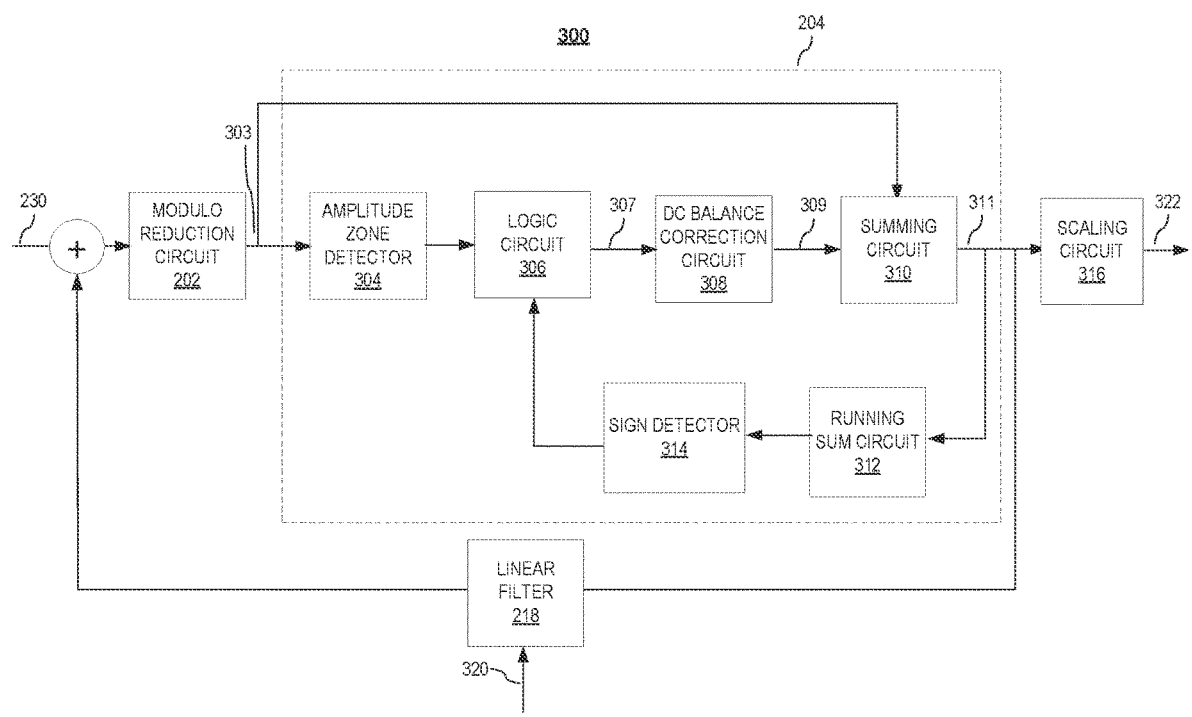
FIG. 3 illustrates an exemplary block diagram of a THP-based transmitter circuit according to various embodiments of the present disclosure.

FIG. 3 illustrates an exemplary block diagram of a THP-based transmitter circuit according to various embodiments of the present disclosure. Same numerals as in FIG. 2 denote similar elements. As depicted in FIG. 3, transmitter circuit 300 may comprise input signal 230, modulo reduction circuit 202, DC nulling circuit 204 that generates DC null signal 311, amplitude zone detector 304, logic circuitry 306, DC balance correction circuit 308, summing circuit 310, scaling circuit 316, running sum circuit 312, sign detector 314, linear filter 218 that may apply a filtering method such as FIR or any other any other filtering method known in the art, input signal 320, and transmitter output signal 322.

In embodiments, input signal 230 received at modulo reduction circuit 202 may be a to-be-transmitted signal has been received from some data source (not explicitly shown). Modulo reduction circuit 202 may apply any number of modulo reduction operations to input signal 230 to define a boundary or otherwise limit input signal 230 to generate bounded signal 303. As depicted, bounded signal 303 may be provided to DC nulling circuit 204 that generates DC nulled signal 311 that may be measured and fed back to logic circuit 306. In embodiments, amplitude zone detector 304, in response to receiving bounded signal 303, may use, e.g., a comparator circuit to determine whether the current signal lies in a range such that transmission of a modulo equivalent signal would only marginally increase the required signal headroom (e.g., 10% of signal amplitude) beyond the original boundary.

In embodiments, logic circuit 306 may use the outputs of both amplitude zone detector 304 and sign detector 314 to decide whether a DC balance correction is warranted and, if so, instruct or cause DC balance correction circuit 308 to execute, e.g., an addition or subtraction of a modulation constant that is applied to summing circuit 310. In embodiments, logic circuit 306 may be implemented, e.g., as a set of AND gates that determine whether amplitude zone detector 304 indicates that the output of modulo reduction circuit 202 is within a desired interval or zone, and, at the same time, whether sign detector 314 indicates that the output of running sum circuit 312 indicates, e.g., whether the DC average of DC null signal 311 is positive or negative over a certain period of time. In embodiments, logic circuit 306 may use the output of sign detector 314 to further determine whether to apply a modulo constant to counteract the sign of DC null signal 311. In embodiments, logic circuit 306 may generate signal 307 whose sign is opposite to that of DC null signal 311 such that when balance correction circuit 308 uses signal 307 to generate correction signal 309 to summing circuit 310, summing circuit 310 acts to offset or move DC null signal 311 in a direction opposite the sign of the current direction of signal 307, thereby, restoring the DC balance of DC null signal 311 that would otherwise be left untreated.

As an example, logic circuit 306 may use determine that the DC average of DC null signal 311 is positive and that the output of modulo reduction circuit 202 falls within a predetermined value range to indicate to DC balance correction circuit 308 that correction circuit 308 should subtract a value equal to a certain modulation constant at summing circuit 310 such as to restore the DC balance of DC null signal 311

In embodiments, DC balance correction circuit 308 may add or subtract, e.g., based on the sign of signal 307, the modulo interval N to bounded signal 303 at summing circuit 310 to achieve the desired notch at DC when creating DC null signal 311. In embodiments, the magnitude of signal 309 that is added to bounded signal 303 may be equal to a modulation constant, e.g., $-2M$, where M is an integer that represents a number of distinct M-ary PAM symbols where the nominal amplitudes of the PAM symbols are given by $\{-M+1, -M+3, \ldots M-3, M-1\}$.

One advantage of the modulo operation employed by modulo reduction circuit 202 is that there exist more than one possible way of representing the same value. As a result, the added or subtracted value leads to the same output. In addition, the effect of adding or subtracting the value in transmitter circuit 300 may subsequently be undone in the receiver circuit (not shown in FIG. 3). In embodiments, the decision when and/or whether to add or subtract may comprise allowing for latitude that accounts for the headroom that was added to bounded signal 303 and allows to and use running disparity 312 to control DC null signal 311 despite the added latitude such that summing circuit 310 restores the DC balance, which otherwise would get lost. In embodiments, applying a counterpart modulo operation at the receiver is, advantageously, not affected by the extended set of permissible amplitudes used for DC nulling of bounded signal 303, allowing the spectrum of transmitter output signal 322 to be shaped in the desired manner by the feedback loop in DC nulling circuit 204.

In embodiments, DC null signal 311 is provided to linear filter 218, which may be implemented as a feedback filter that filters DC nulled signal 311, e.g., by applying feedback coefficients to data in input signal 230. In addition, DC nulled signal 311 may be provided to scaling circuit 316 that, in embodiments, applies an optimal scale factor to DC null signal 311 to match the signal generated as transmitter output signal 322 to the available dynamic range of the mixed signal and analog components of the transmitter output. Finally, transmitter circuit 300 may transmit output signal 322, e.g., over a communication channel to the receiver.

In summary, modulo-equivalent amplitude values may be chosen such as to counter a prevailing DC imbalance at the output of transmitter 300, for signal magnitudes such that the choice of DC restoring value results in an amplitude that modestly extends the amplitude headroom at transmitter 300. In embodiments the required additional headroom to accommodate DC correction equivalent symbols may be chosen as 10%.

As the system depicted in, e.g., FIG. 2, transmitter circuit 300 in FIG. 3 is not limited to the constructional detail shown there or described in the accompanying text. As those skilled in the art will appreciate, additional and/or other circuit components may be used and combined in various configurations. As one example, running sum circuit 312 and sign detector 314 may be implemented as a single component, and so on. Those skilled in the art will further appreciate that, in embodiments, running sum circuit 312 may be implemented as any aggregation circuit that performs steps comprising a moving average operation or a generic low pass filter operation that may be used to determine whether a DC average of the signal output by transmitter 300 is positive or negative.

FIG. 4 illustrates an exemplary use of the PAM decision space as a redundancy according to various embodiments of the present disclosure. As previously mentioned, in THP-based embodiments, a DC nulling circuit may be used to insert to the input signal the transmitter a zero at DC prior to the signal reaching the output of the transmitter. In scenarios where the input signal is a PAM signal, this may be accomplished by using a small portion of the PAM decision space as a redundancy. As a numerical example, if the modulus in use is 4.0, the values +2.1 and −1.9 (denoted as respective numerals 402 and 404 in FIG. 4) are equivalently indicative of a transmitted negative NRZ signal.

Similarly, the values +1.9 and −2.1 (denoted as respective numerals 406 and 408 in FIG. 4) indicate a positive NRZ signal after an appropriate modulo reduction at the receiver. As a result, the regions defined by these values indicate that either the original signal may be used or a signal that has the modulo constant added or subtracted to the signal may be used instead.

Therefore, various embodiments herein may add or subtract the applicable modulo constant in a sign that is opposite to the direction of a running disparity, which tracks an aggregated or accumulated DC imbalance of the transmitter, in exchange for a relatively small sacrifice of peak-to-mean ratio. Since either way of expressing the sample value is equivalent modulo 4, the value that counteracts the present DC imbalance may thus be freely chosen among the two possibilities, and the result may then be used to decide whether or not to apply the modulo constant.

Figure 5:
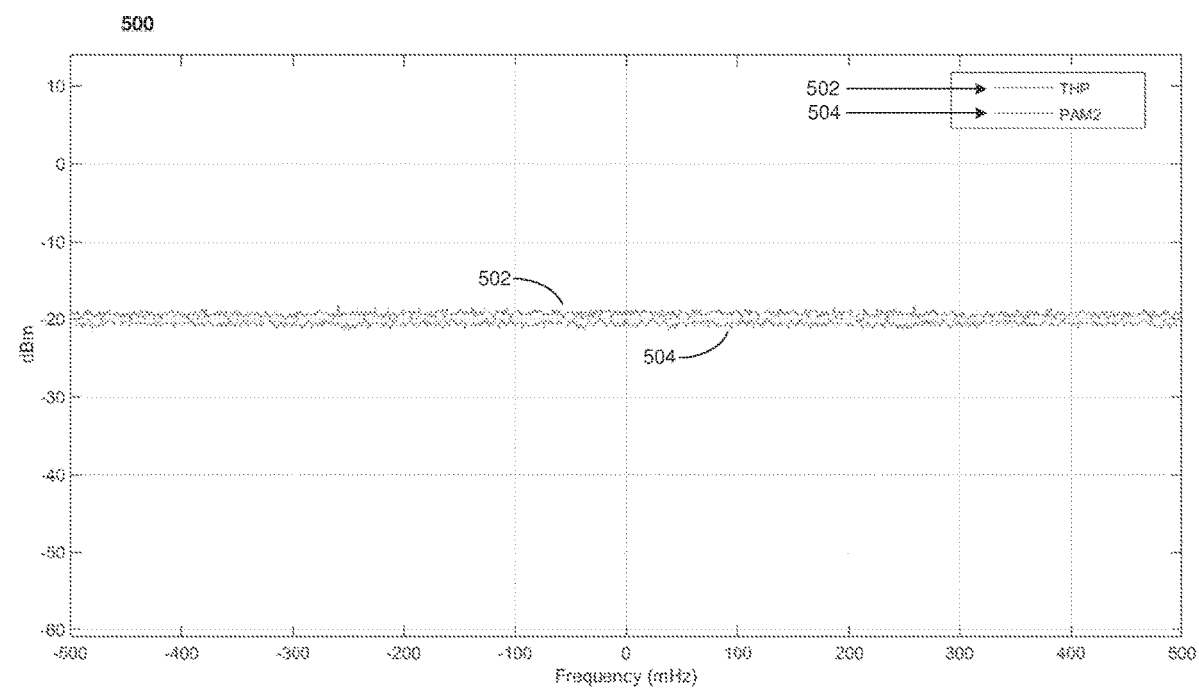
FIG. 5 illustrates exemplary reference spectra for traditional DFE-based and THP-based systems.

FIG. 5 illustrates exemplary reference spectra for traditional DFE-based and THP-based systems. Graph 502 depicts a frequency spectrum that has been obtained with a traditional DFE-based system, whereas graph 504 depicts a frequency spectrum obtained with a traditional THP-based system. As shown neither plot exhibits a noticeable notch around zero Hertz, indicating that both systems are not suitable for communication over AC-coupled communication channels.

Figure 6:
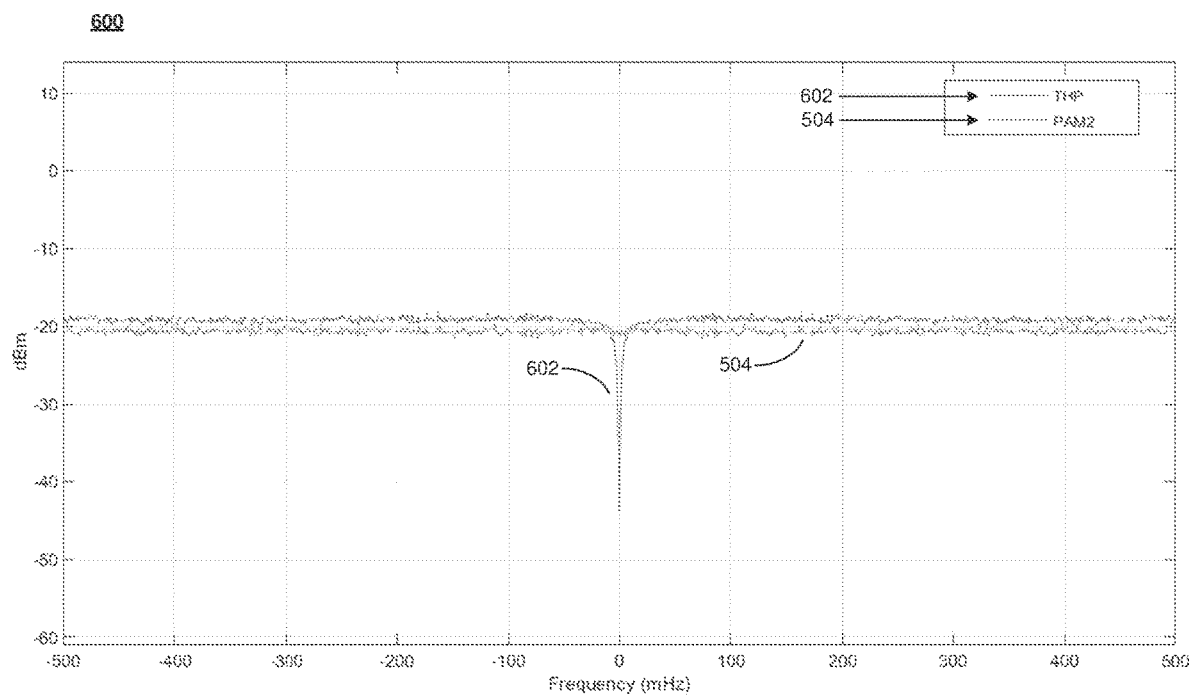
FIG. 6 illustrates experimental results of the impact of DC nulling according to various embodiments of the present disclosure on an exemplary reference spectrum.

FIG. 6 illustrates experimental results of the impact of DC nulling according to various embodiments of the present disclosure on an exemplary reference spectrum. Graph 504 is the same graph as in FIG. 5 and shown as a reference graph. Graph 602 in FIG. 6 depicts a frequency spectrum that has been obtained with a THP-based system according to various embodiments of the present disclosure. It demonstrates how DC nulling can be used to achieve spectral shaping and, in particular, how to create a relatively narrow DC null in a THP-equalized transmitter signal to facilitate transmission over DC-null channels in AC-coupled communication channels.

It shall be noted that these experiments and results are provided by way of illustration and were performed under specific conditions using a specific embodiment or embodiments; accordingly, neither these experiments nor their results shall be used to limit the scope of the disclosure of the current patent document.

Figure 7:
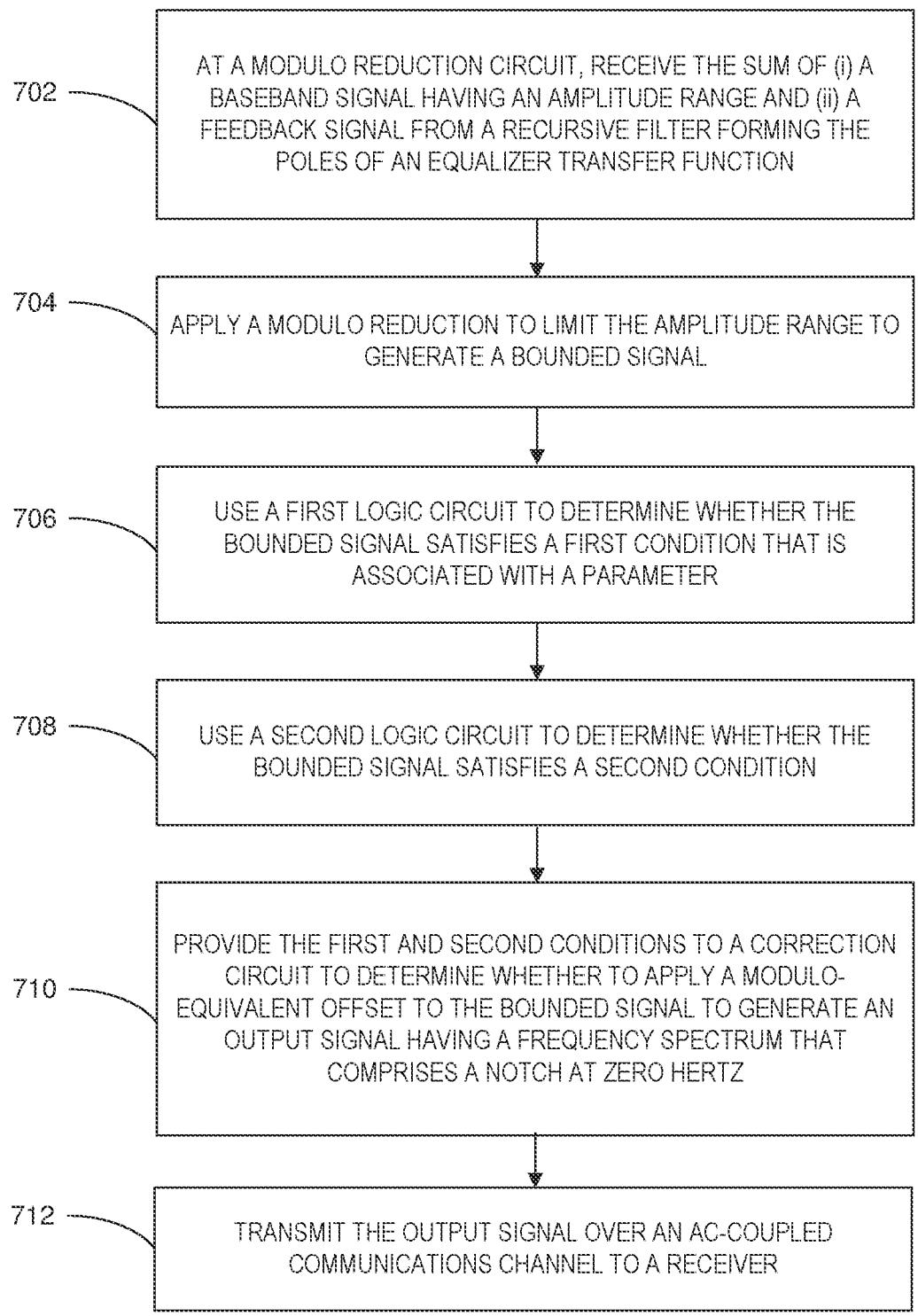
FIG. 7 is a flowchart of an illustrative process for communicating over AC-coupled communication channels using a THP-equalized transmitter in accordance with various embodiments of the present disclosure.

FIG. 7 is a flowchart of an illustrative process for communicating over AC-coupled communication channels using a THP-equalized transmitter in accordance with various embodiments of the present disclosure. In embodiments, process 700 communicating over AC-coupled communication channels may start when at step 702 a modulo reduction circuit receives the sum of a baseband signal and a feedback signal from a recursive filter that form the poles of an equalizer transfer function. In embodiments, the baseband signal may have an amplitude range and comprise an M-ary PAM signal, and the modulo reduction may comprise at least one of a conditional operation or a binary arithmetic overflow operation.

In embodiments, the recursive filter may be coupled to a summing circuit whose output is coupled to the modulo reduction circuit.

At step 704, the modulo reduction circuit may apply a modulo reduction to limit the amplitude range to generate a bounded signal.

At step 706, a first logic circuit may be used to determine whether the bounded signal satisfies a first condition that is associated with a parameter. In embodiments, increasing the parameter may increase (1) a zone of signal amplitudes wherein modulo-equivalent symbols are allowable, (2) the amplitude range of the output signal, and (3) a depth of a notch that is created at step 710. In embodiments, the increased amplitude range may be compensated, by a scaling circuit at the output of the transmitter.

At step 708, a second logic circuit may be used to determine whether the bounded signal satisfies a second condition, e.g., a condition that is representative of an aggregated positive of negative DC imbalance in a transmitter output signal.

At step 710, the first and second conditions may be provided to a correction circuit that determines whether to apply a modulo-equivalent offset to the bounded signal, e.g., by adding to the bounded signal a modulo constant that has a sign that is opposite to that of the DC imbalance. The correction circuit may generate the transmitter output signal in a manner such the frequency spectrum of the signal has a notch at or near zero Hertz. In embodiments, the modulo constant may be chosen to be the product of the alphabet size of the utilized M-ary PAM modulation, i.e., the product of a cardinal number of PAM symbols used by the system, e.g., {−3, −1, +1. +3} for PAM-4 implementations, and the Euclidean distance between adjacent pairs of the PAM symbols.

At step 712, the output signal may be transmitted to a receiver, e.g., over an AC-coupled communications channel.

One skilled in the art will recognize that: (1) certain steps may optionally be performed; (2) steps may not be limited to the specific order set forth herein; (3) certain steps may be performed in different orders; and (4) certain steps may be done concurrently. A person skilled in the art will further recognize no computing system or programming language is critical to the practice of the present invention. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It is also noted that elements of any claims may be arranged differently including having multiple dependencies, configurations, and combinations.

What is claimed is:

1. A method for communication over alternate current-coupled (AC-coupled) channels using Thomlinson Harashima-equalized (TH P-equalized) transmitters, the method comprising:
   at a first modulo reduction circuit, receiving the sum of (i) a baseband signal having an amplitude range and (ii) a feedback signal from a recursive filter forming the poles of an equalizer transfer function;
   applying a modulo reduction to limit the amplitude range to generate a bounded signal;
   using a first logic circuit to determine whether the bounded signal satisfies a first condition that is associated with a parameter;
   using a second logic circuit to determine whether the bounded signal satisfies a second condition; and
   providing the first and second conditions to a correction circuit to determine whether to apply a modulo-equivalent offset to the bounded signal to generate an output signal having a frequency spectrum that comprises a notch at or near zero Hertz; and
   transmitting the output signal over an AC-coupled communication channel to a receiver.

2. The method of claim 1, wherein the second condition is representative of an aggregated direct current (DC) imbalance in the output signal, the aggregated DC imbalance having a first sign.

3. The method of claim 2, wherein applying the modulo-equivalent offset comprises adding to the bounded signal a modulo constant that has a second sign that is opposite to the first sign.

4. The method of claim 3, wherein the modulo constant represents a product of a cardinal number of utilized pulse amplitude modulation (PAM) symbols and an Euclidean distance between adjacent pairs of the PAM symbols.

5. The method of claim 1, wherein increasing the parameter increases a zone of signal amplitudes wherein modulo-equivalent symbols are allowable, increases the amplitude range of the output signal, and increases a depth of the notch.

6. The method of claim 5, further comprising using a scaling circuit to compensate for the increased amplitude range.

7. The method of claim 1, wherein the baseband signal comprises an M-ary PAM signal, and the modulo reduction comprises at least one of a conditional operation or a binary arithmetic overflow operation.

8. The method of claim 1, wherein the recursive filter is coupled to a summer whose output is coupled to the first modulo reduction circuit.

9. The method of claim 1, further comprising, in response to obtaining an impulse response for the AC-coupled communication channel, using at least one of a Minimum Mean Squared Error (MMSE) criterion or a Zero Forcing (ZF) criterion to determine at least one of feedforward tap values or feedback tap values.

10. The method of claim 9, further performing at least one of using the feedback tap values to initialize the recursive filter or using the feedforward tap values to initialize the receiver.

11. The method of claim 9, further comprising, iteratively adjusting one or more feedback tap values to track changes in the AC-coupled communication channel.

12. The method of claim 11, wherein iteratively updating comprises utilizing gradient descent iterations based on slicer error signals that have been measured at the receiver.

13. A system for communicating over alternate current-coupled (AC-coupled) channels using Thomlinson Harashima-equalized (THP-equalized) transmitters:
   a first modulo reduction circuit that in response to receiving the sum of (i) a baseband signal having an amplitude range and (ii) a feedback signal from a recursive filter forming the poles of an equalizer transfer function, applies to the sum a modulo reduction to limit the amplitude range to generate a bounded signal;
   a summing circuit coupled to receive the bounded signal and output a DC null signal;
   an amplitude zone detector circuit coupled to the first modulo reduction circuit, the amplitude zone detector circuit determines whether the bounded signal falls in a range such that a transmission of a modulo-equivalent signal would increase a signal headroom of a signal amplitude less or equal to a limit;
   an aggregation circuit that in response to receiving the direct current (DC) null signal generates a DC average of the DC null signal, the DC average having a first sign;
   a logic circuit coupled to the amplitude zone detector circuit, the logic circuit, in response to determining to apply a modulo constant, generates a signal whose sign is opposite to the first sign; and
   a balance correction circuit coupled to the logic circuit, the balance correction circuit, in response to receiving the signal, applies a modulo-equivalent offset to the bounded signal to generate an output signal having a frequency spectrum that comprises a notch at or near zero Hertz.

14. The system of claim 13, wherein the amplitude zone detector circuit and the logic circuit are embedded in a single circuit.

15. The system of claim 13, wherein the first modulo reduction circuit is implemented in a pre-equalizer circuit that comprises a modulo-limited recursive filter, and wherein the output signal is a pre-equalized output signal.

16. The system of claim 15, further comprising a receiver that, in response to receiving the pre-equalized output signal over an AC-coupled communication channel, uses a linear, feed-forward signal that is followed by a second modulo reduction circuit to approximate pulse amplitude values of the baseband signal.

17. The system of claim 13, further comprising a linear filter that is implemented as a feedback filter and that applies feedback coefficients to data in the baseband signal to filter the DC nulled signal.

18. The system of claim 13, further comprising a scaling circuit that, in response to receiving the DC nulled signal, applies a scale factor to the DC null signal.

19. The system of claim 13, wherein applying the modulo-equivalent offset comprises adding to the bounded signal a modulo constant.

20. The system of claim 19, wherein the modulo constant represents a product of a cardinal number of utilized pulse amplitude modulation (PAM) symbols and an Euclidean distance between adjacent pairs of the PAM symbols.

* * * * *